United States Patent [19]

Hirabayashi

[11] 4,068,554

[45] Jan. 17, 1978

[54] SHEET SCREW

[76] Inventor: Fumio Hirabayashi, 11-11, 3-chome, Nishimikuni,Yodogawa-Osaka, Japan

[21] Appl. No.: 646,884

[22] Filed: Jan. 6, 1976

[30] Foreign Application Priority Data

Nov. 4, 1975 Japan ............................ 50-150991[U]

[51] Int. Cl.² ............................................. F16B 25/00
[52] U.S. Cl. ........................................................ 85/41
[58] Field of Search .................. 85/41, 44, 47, 30, 22, 85/20, 1 P; 408/226, 227

[56] References Cited

U.S. PATENT DOCUMENTS

| Re. 20,580 | 12/1937 | Brown | 85/47 |
|---|---|---|---|
| 1,909,476 | 5/1933 | Trotter | 85/41 |
| 1,978,145 | 10/1934 | Rosenberg | 85/44 X |
| 2,212,787 | 8/1940 | Miller | 85/30 X |
| 3,156,152 | 11/1964 | Reed | 85/41 |
| 3,370,501 | 2/1968 | Ansingh | 85/47 |

FOREIGN PATENT DOCUMENTS

| 247,297 | 9/1963 | Australia | 85/41 |
|---|---|---|---|
| 616,466 | 2/1961 | Italy | 85/41 |

Primary Examiner—Ramon S. Britts
Attorney, Agent, or Firm—Birch, Stewart, Kolasch & Birch

[57] ABSTRACT

A sheet screw comprising a screw head, a threaded shank connected at its top to the screw head, a substantially pyramidal end extending from the bottom of the threaded shank to terminate in a point, the pyramidal end having a tip portion disposed adjacent the point, and a base portion disposed between the tip portion and the bottom of the threaded shank, the tip portion being regularly polygonal in cross section and having a certain number of edges with an obtuse angle extending divergently from the point toward the base portion, the base portion having a smaller number of rounded ridges relative to the number of flat sides and the same number of edges of the tip portion, and each of curved outer surfaces of the rounded ridges becoming wider as it approaches the bottom of the threaded shank.

9 Claims, 13 Drawing Figures

U.S. Patent  Jan. 17, 1978  Sheet 1 of 2  4,068,554
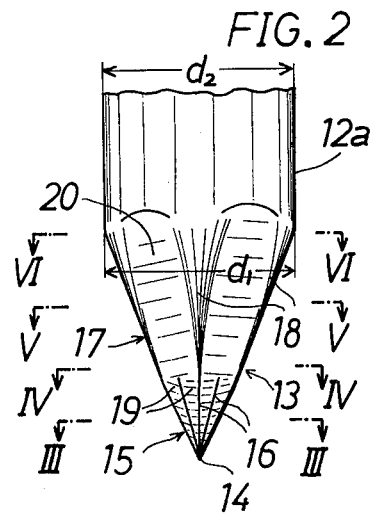
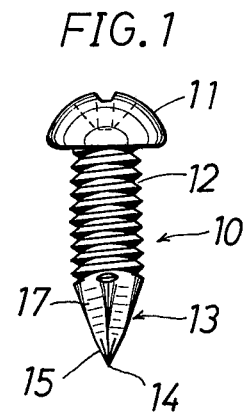
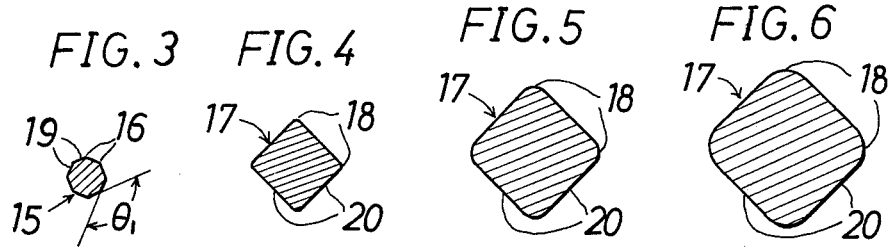
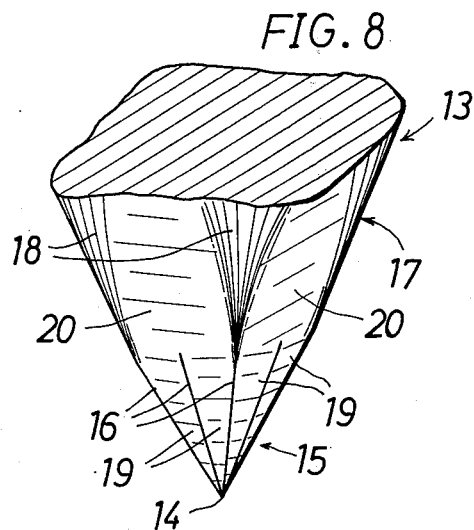
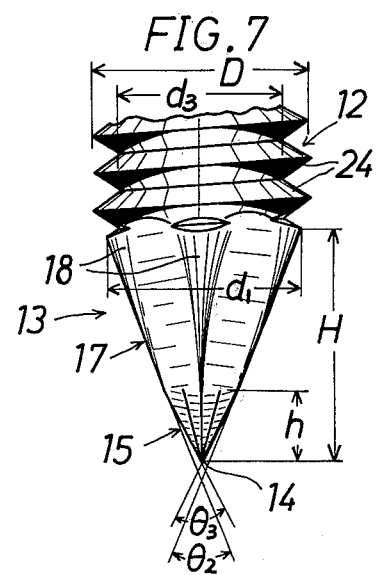

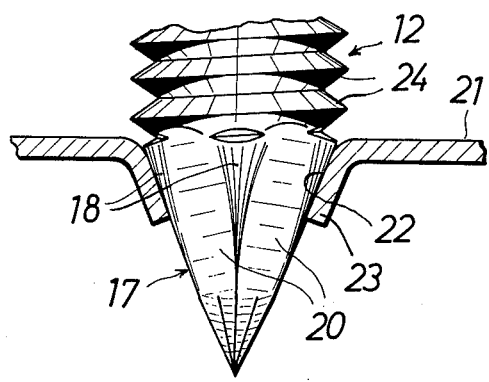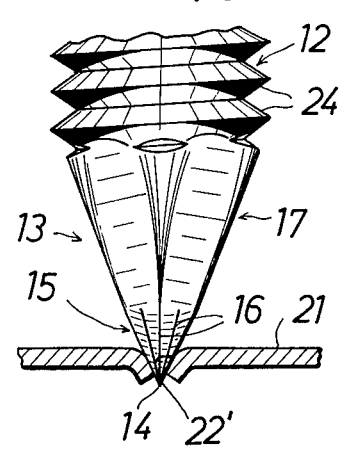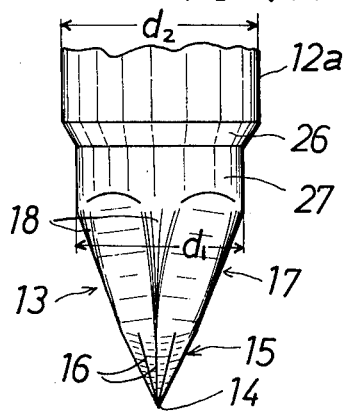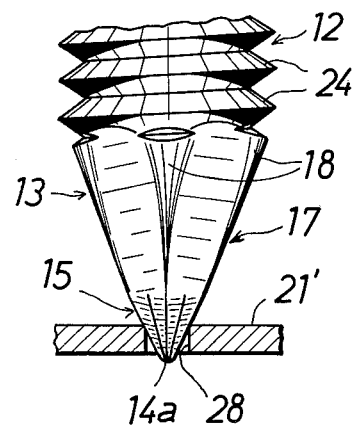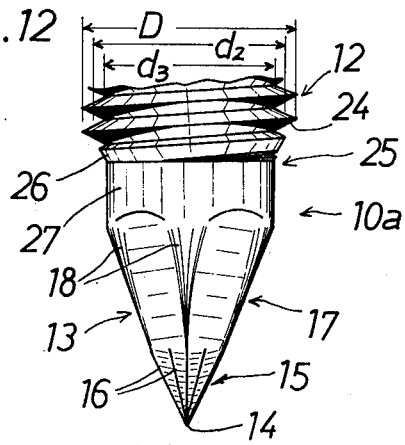

SHEET SCREW

BACKGROUND OF THE INVENTION

1. Field of the Invention

The present invention relates to a sheet screw, and more particularly to an improvement in a thread-forming or self-tapping screw which is especially designed for screwing into a metallic sheet, a thin metallic plate coated with a synthetic resin film or the like sheet member.

2. Prior Art

In fastening a screw into a thin metallic sheet member, a certain conventional method is known wherein a screw is inserted with its threaded shank through a previously drilled hole of slightly greater diameter than the external thread diameter of the screw shank and is then screwed up tightly onto a nut provided at the reverse side of the sheet member for holding the inserted screw. A further method is also known wherein a sheet member is at first formed with a small pilot hole by means of drilling or by means of process, this hole is in the next stage forcibly enlarged by inserting a conical push-out punch or the like thereinto in order to form an integral socket of substantially cylindrical shape that protrudes outwardly from the opening of the hole at the reverse side of the sheet member, and then said hole as well as the protruding socket are internally threaded with a tapping device for facilitating engagement with a mating external thread of a screw. However, such conventional methods are extremely uneconomical. Thus, there have recently been proposed several types of self-tapping sheet screws which are applicable merely to a previously drilled hole of smaller diameter than the external thread diameter of the screw shank. However, such types of screws still waste time and are expensive to use, since they require at least two separate steps, viz. first a drilling operation and then a screwing operation.

Thus, more recently, several different types of self-tapping sheet screws have been proposed which are provided at one shank end with a tapered work-entering portion which has sharp cutting edges extending respectively along an entire tapered surface of said work-entering portion to terminate in a pointed end, whereby a sheet is pierced to form an initial pilot aperture of small diameter, which is, in turn, forcibly enlarged and deformed to form a substantially annular protrusion extending outwardly from the circular edges of the aperture on the opposite side of the sheet, as said work-entering portion intrudes thereinto. Although this type of prior art screw is convenient to use in a sense, since it permits fastening in a single screwing operation, it still has many disadvantages, the first and most significant being that the sheet is not only easily cracked around the vicinity of the formed aperture during the forcible intrusion of said tapered workentering portion, but also suffers from early propagation of fatigue cracks. Further, the initial development of the cracks invites the second disadvantage that the protrusion formed in the sheet material is not sufficient in height, so that the mating threads to be formed on the internal face of the protrusion are not sufficient in number to firmly support the screw shank to be received therein. The third disadvantage is that the aperture is not only excessively enlarged, but the peripheral wall of the aperture is also partially reduced in thickness due to the tearing or scratching-off function of the cutting edges of said tapered portion, so that the desired securing force is not obtained. This third disadvantage is especially important when screwing into aluminum plate or other soft sheet material or into a very thin tinned sheet-iron. The fourth disadvantage is that the screw is likely to advance into the sheet at an angle due to the presence of the cracks caused by the forcible intrusion of the work-entering portion as well as due to the probable lack of uniformity in the thickness surrounding the aperture caused by scratching-off of the sharp cutting edges of the work-entering portion.

SUMMARY OF THE INVENTION

In order to solve the above-discussed problem, the Applicant has proposed a certain improved type of sheet screw having a pyramidal end which includes a plurality of rounded ridges extending from the bottom of a threaded shank toward a tip portion, which was disclosed in detail in U.S. patent application Ser. No. 597,285 filed July 18, 1975. Though this previous type of sheet screw has many advantages, the sheet screw according to the present invention is superior thereto especially in forming a sufficient height and wall thickness of an annular protrusion around the initial aperture. The above mentioned previous type of sheet screw is provided with a tip portion having a plurality of sharp cutting ridges which perform a drilling operation to produce a certain amount of chips, whereby the height and wall thickness of the protrusion are reduced by the quantity of chips, so that the desired securing force is relatively decreased.

According to the present invention, there is provided a sheet screw comprising a screw head, a threaded shank connected at its top to said screw head, a substantially pyramidal end extending from the bottom of said threaded shank to terminate in a point, said pyramidal end having a tip portion disposed adjacent said point, and a base portion disposed between said tip portion and said bottom of said threaded shank, the maximum diameter of said pryamidal end being not larger than a blank diameter of said blank, said tip portion being regularly polygonal in horizontal cross section and having a certain number of flat sides and the same number of edges with an obtuse angle extending divergently from said point toward said base portion, said base portion having a smaller number of rounded ridges relative to the number of said edges of the tip portion, the sides of the base portion being connected with the rounded ridges so as to provide a smoothly continuous contour line, and each of curved outer surfaces of said rounded ridges becoming wider as it approaches the bottom of said threaded shank, thereby producing a curvature of said curved outer surface varying so as to be progressively increasing in radius toward the bottom of said threaded shank.

It is, therefore, an object of the present invention to provide an improved sheet screw which is so designed to be firmly secured to a sheet member.

Another object of the invention is to provide an improved sheet screw which is designed so as to form a screw shank securing protrusion with sufficient height and wall thickness at the reverse side of the sheet member.

A further object of the invention is to provide an improved sheet screw which is capable of eliminating the undesirable tearing or scratching-off function by not providing sharp cutting edges in the prior art sheet screws.

A still further object of the invention is to provide an improved sheet screw which can be tightly secured even though the sheet member into which the screw is driven is very thin or is made of aluminum or similar soft material.

A still further object of the invention is to provide an improved sheet screw which permits fastening in a single screwing operation without developing undesirable cracks when it is forcibly driven into the sheet member.

A yet further object of the invention is to provide an improved sheet screw which permits normal and smooth intrusion into the sheet member.

The above and other objects, features and advantages of the present invention will become more apparent from the following description of some of the preferred embodiments thereof taken in conjunction with the accompanying drawings. It is to be expressly understood, however, that the drawings are for purpose of illustration only and are not intended as definition of the limits of the present invention, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a front elevation of a sheet screw embodying the present invention;

FIG. 2 is an enlarged fragmentary elevation showing in detail the screw end portion formed with a blank according to the present invention;

FIGS. 3 to 6 are horizontal cross sections taken along the lines III—III, IV—IV, V—V and VI—VI of FIG. 2, respectively;

FIG. 7 is an enlarged fragmentary elevational view of the sheet screw of FIG. 1, illustrating the end portion after threads have been formed with the blank of FIG. 2; FIG. 8 is a greatly enlarged fragmentary perspective view showing in detail the tip portion of the flat sides 19 of the sheet screw of FIG. 1;

FIG. 9 is an enlarged fragmentary elevational view of the sheet screw of FIG. 1, illustrating the end portion thereof piercing a sheet member to form an initial aperture therein;

FIG. 10 is a similar view to FIG. 9 illustrating an integral burred protrusion being formed around the aperture in the sheet member;

FIGS. 11 and 12 are enlarged fragmentary elevations showing a modified embodiment according to the present invention, wherein a pilot portion is provided at the bottom of the screw shank; and FIG. 13 is also a similar view to FIG. 9 illustrating a further modification of the present invention to be applied to a previously drilled hole.

DESCRIPTION OF THE PREFERRED EMBODIMENTS

Referring now to the drawings, a sheet screw 10 according to the present invention has a screw head 11, a threaded shank 12 of substantially cylindrical shape connected at its top to said screw head 11, and a non-threaded substantially pyramidal end 13 which extends from the bottom of said threaded shank 12 to terminate in a point 14. Said pyramidal end 13 is divided into two parts, viz. a tip portion 15 with at least five edges 16 extending divergently from the point 14, and a base or frustum portion 17 with at least three rounded ridges 18. In other words, the tip portion 15 has at least five flat sides 19, and therefore, an angle $\theta_1$ in FIG. 3 must be at least greater than 108°. The base portion 17 as illustrated in the embodiments of FIGS. 1 to 13 has a substantially square cross section, however, it may be replaced by a modified base portion (not shown) having a triangular, pentagonal or other regular polygonal cross section, but the number of sides 20 of a base portion must be less than the number of sides of a tip portion. As a matter of fact, providing an even number of flat sides 19, 20 is preferable from the technical view point. For example, if the base portion has four sides, the tip portion may preferably be a regular hexagon or octagon. Further, it should be noted that each of said sides 20 of the base portion 17 must be smoothly continuous with a pair of adjacent rounded ridges 18 so as to provide a smoothly continuous contour line as shown in FIG. 6.

In the above-described construction of the sheet screw 10, the pyramidal angle, i.e., the vertically opposite angle of the base portion 17 as indicated by $\theta_2$ in FIG. 7 may vary preferably within the range of 25° to 35°, while, the pyramidal angle, i.e., the vertically opposite angle $\theta_3$ (FIG. 7) should be equal to or larger than said angle $\theta_2$. The most preferable value of the angles $\theta_2$ and $\theta_3$ should be determined in accordance with the hardness and thickness of the sheet material to which the screw 10 is to be applied as well as with the size of the screw to be employed. Generally, in the case of the sheet 21 being made of iron or similar hard material of a considerable thickness, the angles $\theta_2$, $\theta_3$ should be increased to about 35°, while, if the sheet 21 is of aluminum or similar softer material of relatively smaller thickness, the angles $\theta_2$, $\theta_3$ should be decreased to about 25°.

Further, the number of polygonal sides 19 and 20 of each of the base portion and the tip portion may also vary in accordance with the hardness and thickness of the sheet 21. Generally, it is preferable to increase the number of the sides 19, 20 for harder and thicker material. However, as far as the base portion 17 is concerned, eight or more polygonal sides 20 should be avoided because a base portion having that many sides will approach the shape of a circular cone, and as a result, the stress concentration on each of the many rounded ridges 18 will be dispersed, so that the initial aperture 22' (FIG. 9) cannot be effectively enlarged enough to form a protrusion 23 of a desired height without development of undesirable cracks around the aperture 22.

The tip portion 15 is of the height defined by the reference (h) in FIG. 7, while the height of the base portion 17 is defined by (H-h) in FIG. 7. The value of (h) should be equal to or less than one third of the value of (H) in order to form the protrusion most effectively, and the most suitable values of (h) and (H) should be determined principally in dependence on the thickness of the sheet 21.

The maximum diameter ($d_1$) of the base portion 17 may preferably be equal to or slightly less than the diameter ($d_2$) of a blank 12a (FIG. 2) in order to prevent the protrusion 23 from being excessively enlarged. On the other hand, if the difference between the maximum thread diameter (D) of FIG. 7 and said diameter ($d_1$) is too large, the threaded shank 12 cannot intrude smoothly into the sheet 21. Therefore, the diameter ($d_1$)

is preferably larger than the root diameter ($d_3$) of the threads 24. In this connection, as well known to those skilled in the art of screw forming, the maximum diameter (D) typically becomes larger than the blank diameter ($d_2$) when the threads 24 are formed by the rolling method. Thus, by making ($d_1$) equal to or slightly smaller than ($d_2$) at the forming stage as shown in FIG. 2, the preferable difference value (D-$d_1$) is easily obtained. However, as illustrated in FIGS. 11 and 12, if a pilot portion 25 having a tapered portion 26 and a non-threaded cylindrical portion 27 is provided between the bottom of the threaded shank 12 and the top of the pyramidal end 13, and if the diameter of said cylindrical portion 27 is equal to the maximum diameter ($d_1$) of the base portion 17 but is smaller than the blank diameter ($d_2$), the minimum value of ($d_1$) may be reduced to be substantially equal to the root diameter ($d_3$) of the threads 24. Providing of this pilot portion 25 permits very smooth intrusion of the screw into the sheet even if the sheet material is hard and relatively thick.

Both the tip portion and the base portion 17 increase in diameter as they approach the bottom of said threaded shank 12, and the curved surface of each rounded ridge 18 of the base portion 17 spreads wider as it increases in diameter, thereby producing a curvature of said curved outer surface carrying so as to be progressively increasing in radius toward the bottom of said threaded shank. The size and curvature of the rounded ridges 18 may preferably be determined in accordance with the thickness as well as the characteristics of the sheet material to which the screw 10 is to be applied.

In operation, when the screw 10 is driven by means of a known power driver, the point 14 at first pierces the sheet member 21 at a desired location to form a pin hole therein. The hole is then enlarged by a drilling function of the tip portion 15 to form an initial aperture 22' as shown in FIG. 9. In this stage, since the tip portion 15 has more than five flat sides 19 and therefore each of the angles $\theta_1$ (FIG. 3) is at least greater than 108°, each of the edges 16 hardly performs any cutting-off operation during drilling. As a result, scarcely any chips are produced. As soon as the tip portion 15 has formed the initial aperture 22', the base portion 17 enters the aperture 22' to expand it forcibly to form an enlarged aperture 22 together with a substantially annular burred protrusion 23 which extends outward from the reverse side of the sheet 21, as shown in FIG. 10. In this stage, it will be easily understood that, by determining the angle $\theta_3$ to be greater than the angle $\theta_2$, the base portion 17 is allowed to enter the initial aperture 22' quite smoothly and easily. Next, the threaded shank 12 is driven through the enlarged aperture 22 into said formed protrusion 23 to form mating internal threads therewith by the self-tapping function of the external threads 24 rolled on the shank 12.

In the above operation, because of to the construction of the base portion 17 wherein each of the rounded ridges 18 has a gradually expanding smooth outer surface as illustrated, the initial aperture 22' of small diameter formed by the piercing function of the tip portion 15 will be smoothly and gradually enlarged to form a protrusion 23 of a desired height without producing undesirable cracks in the sheet material therearound. Further, the interior walls of the aperture 22 as well as those of protrusion 23 will be free from tearing or scratching during the operation.

In a modified sheet screw 10a as illustrated in FIG. 11 and 12, the operational manner is substantially the same as described hereinabove. However, because of the design of the pilot portion 25, the intrusion of the threaded shank 12 is more easily attained than the aforementioned sheet screw 10. Thus, this modified sheet screw 10a is convenient to use with a hard and relatively thick sheet member. The manufacturing cost of the sheet screw 10a may be higher than the sheet screw 10.

It is obvious that the sheet screw according to the present invention may be applied to a sheet member 21' as illustrated in FIG. 13 having a preformed hole 28 therein. For use with such sheet member 21' including a hole, it is not necessary to sharpen the screw point 14a. Namely, the screw point 14a may be dull.

Further, it is also apparent that said pilot portion 25 may consist either of only a cylindrical portion 27 or of only a tapered portion 26.

The invention being thus described, it will be obvious that the same may be varied in many wasys. Such variations are not to be regarded as a departure from the spirit and scope of the invention, and all such modifications are intended to be included within the scope of the appended claims.

What I claim is:

1. A sheet screw comprising:
   a screw head;
   a threaded shank formed of a blank by rolling and connected at its top to said screw head;
   a substantially pyramidal end extending integrally from a bottom of said threaded shank to terminate in a point;
   a maximum diameter of said pyramidal end being not larger than a blank diameter of said blank;
   said pyramidal end having a tip portion disposed adjacent said point, and a base portion disposed between said tip portion and said bottom of said threaded shank;
   said tip portion being of a substantially regular polygon in cross section having at least five edges and at least five flat sides extending divergently from said point to said base portion;
   said base portion being of a substantially regular polygon in cross section having at least three sides and at least three rounded ridges with curved outer surface;
   each of said sides of said base portion being connected with a pair of adjacent rounded ridges of said base portion so as to provide a smoothly continuous contour line;
   said tip portion being provided with more sides than said base portion; and
   said curved outer surface of each of said rounded ridges becoming wider as it approaches the bottom of said threaded shank, thereby producing a curvature of said curved outer surface varying so as to be progressively increasing in radius toward the bottom of said threaded shank.

2. The sheet screw, as set forth in claim 1, wherein:
   both of said tip portion and said base portion have an even but different number of sides, respectively.

3. The sheet screw, as set forth in claim 1, wherein:
   a vertical height of said tip portion is not more than one third of an entire vertical height of said pyramidal end.

4. The sheet screw, as set forth in claim 1, wherein:

a pyramidal angle $\theta_3$ of said tip portion is not less than a pyramidal angle $\theta_2$ of said base portion.

5. The sheet screw, as set forth in claim 1, wherein: said pyramidal angle $\theta_2$ of said base portion is within a range of 25° to 35°.

6. The sheet screw, as set forth in claim 1, which includes:
   a pilot portion disposed between said threaded shank and said base portion;
   said pilot portion having a tapered portion and a non-threaded cylindrical portion;
   said tapered portion being connected at its enlarged top to the bottom of said threaded shank;
   said non-threaded cylindrical portion having a diameter smaller than said blank diameter of said blank;
   said non-threaded cylindrical portion having its top connected to a reduced bottom of said tapered portion and having its bottom connected to a top of said base portion; and
   a maximum diameter of said base portion being substantially equal to a root diameter of threads formed on said threaded shank.

7. The sheet screw, as set forth in claim 1, which includes:
   a pilot portion consisting of a non-threaded cylindrical portion only disposed between said threaded shank and said base portion; and
   said non-threaded cylindrical portion having its top connected to the bottom of said threaded shank and having its bottom connected to the top of said base portion.

8. The sheet screw, as set forth in claim 1, which includes:
   a pilot portion consisting of a tapered portion only disposed between said threaded shank and said base portion; and
   said tapered portion having its enlarged top connected to the bottom of said threaded shank and having its reduced bottom connected to the top of said base portion.

9. The sheet screw, as set forth in claim 1, wherein: said point of said pyramidal end is dull.

* * * * *